S. COHN.
ADJUSTABLE CLAMP.
APPLICATION FILED JUNE 7, 1918.

1,292,712.

Patented Jan. 28, 1919.

Inventor
Samuel Cohn
By his atty Charles G Hensley

UNITED STATES PATENT OFFICE.

SAMUEL COHN, OF NEW YORK, N. Y., ASSIGNOR TO POLICE TRAFFIC AUTO SIGNAL COMPANY, A CORPORATION OF NEW YORK.

ADJUSTABLE CLAMP.

1,292,712.     Specification of Letters Patent.     Patented Jan. 28, 1919.

Original application filed January 31, 1918, Serial No. 214,711. Divided and this application filed June 7, 1918. Serial No. 238,652.

*To all whom it may concern:*

Be it known that I, SAMUEL COHN, a citizen of the United States, and a resident of the borough of Bronx, city and State of New York, have invented certain new and useful Improvements in Adjustable Clamps, of which the following is a specification.

This application is a division of my application Serial Number 214,711, filed January 31, 1918.

My present invention relates to adjustable clamps. I have utilized it for holding the signal or semaphore box of an automobile signaling device in various positions upon the supporting bracket, but it will be apparent that my invention is adapted for many other uses.

The object of my invention is to provide a simple, inexpensive and efficient clamp for holding two members in such relation that they may be adjusted in their relative positions upon a ball and socket connection and so that the parts may be easily and securely clamped in any adjusted relation. The construction is much lighter than most of the solid ball and socket clamps and the principal parts may be stamped from sheet metal.

In the drawing forming part of this application,

Figure 1:
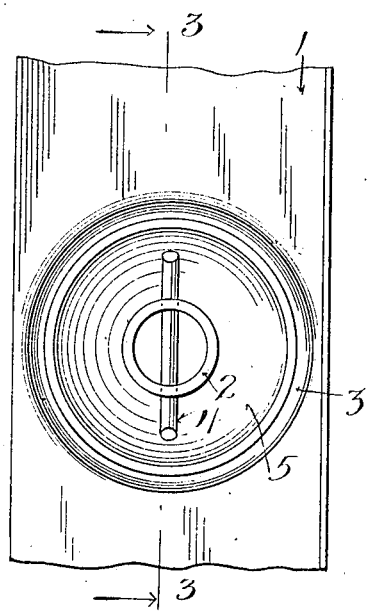
Figure 1 is an end view of a tubular bracket with a body mounted thereon by means of my improved clamp.
Figure 3:
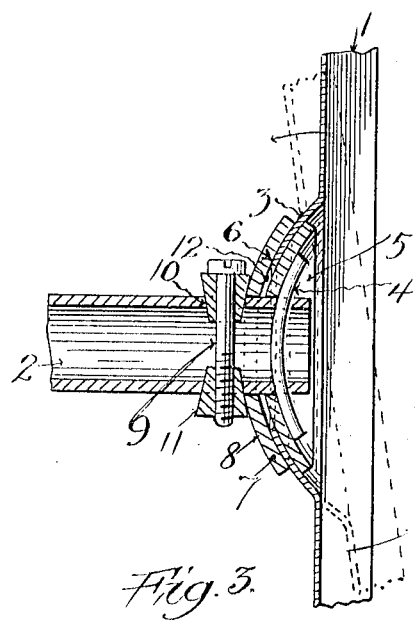
Fig. 3 is a sectional view taken on the line 3—3 of Fig. 1.
Figure 2:
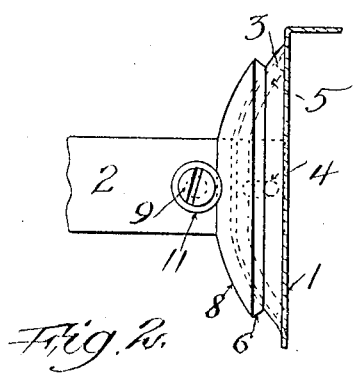
Fig. 2 is a plan view thereof.

In the drawing I have shown a fragment 1 of a box or frame which may be the article which is to be adjustably supported upon a support such as a bracket 2. In the application of which this case is a division the casing 1 constitutes a box forming part of an automobile signal but it is to be understood that the present device is adapted for other uses.

The wall 1 has stamped or drawn thereon a spherical socket 3 forming part of a universal joint for connecting the member 1 with the supporting bracket 2. The bracket 2 is shown herein as a tube. It is not necessary that the supporting member be a tube but my present device makes it convenient to use a tube where lightness is a desirable feature. This support 2 has a curved cotter pin 4 extending through it to form an abutment for a spherical disk or washer 5 which rests against one surface (the concave surface) of the socket member 3 and conforming to the curvature of the latter.

There is a washer 6 having a concave surface 7 fitting against the convex surface of the socket member 3, so that this washer engages the latter from the opposite side to the washer 5. The washer 6 preferably has its rear surface 8 convexed, as shown.

The means for tightening the washers 5, 6 against the socket member 3 comprises a bolt 9 which passes through apertures 10 in the tube 2 just beyond the washer 6. This bolt has wedge or cone shaped members 11 arranged in opposite positions and extending partly within the apertures 10 in the tube 2; and these wedge shaped members are adapted to be forced toward each other when the bolt 9 is tightened. The cone or wedge shaped members 11 conform more or less to the convex surface 8 of the washer 6 and when they are forced toward each other by the tightening of the bolt they force the washers 5, 6 and socket 3 tightly against each other and against the cotter pin 4 and in this manner the universal joint is clamped in any desired position.

The central aperture 12 of the socket member is larger than the tube 2 in order that the member 1 may be turned at any desired angle in relation to the bracket. To position the member 1 at any desired angle it is only necessary to loosen the bolt 9 to partially relieve the pressure of the wedge members 11 upon the universal joint. The member 1 may then be turned to any desired position; and during this adjustment the socket member 3 turns between the washers 5, 6, whose engaging surfaces are parallel therewith. The washers themselves remain stationary during this adjustment; that is to say, they do not turn with the socket member 3. When the member 1 is properly positioned the bolt 9 is tightened and this forces the wedge members toward each other and they in turn force the washers and socket members together.

The present device is light and inexpensive and the clamp holds the parts very firm.

Having described my invention what I claim is:

1. A device of the class described comprising a curved socket member, a support, members for clamping the socket member between them to hold the socket member in various angular positions in relation to the support and a wedge device for tightening said socket member and said clamping members against each other.

2. A device of the class described comprising a spherical socket member forming part of a universal joint and provided with an aperture, a bracket extending through said aperture, washers on said bracket adapted to clamp said socket member between them, cone shaped wedges projecting into said bracket and adapted to force said washers and socket members together and a bolt adapted to move said wedges toward each other to tighten said washers and socket members.

3. A device of the class described comprising a tubular support, a concavo-convex socket member adapted to be held on said support and having an aperture through which the support projects, of larger diameter than said support, a curved cotter pin in said support, a curved washer between the cotter pin and one surface of said socket member, a curved washer engaging the opposite surface of said socket member, a bolt passing through said support, and wedge members adapted to be drawn toward each other by said bolt and adapted to act on said latter washer to clamp the socket member and washers.

Signed at the city, county and State of New York, this 14th day of May, 1918.

SAMUEL COHN.

Copies of this patent may be obtained for five cents each, by addressing the "Commissioner of Patents, Washington, D. C."